United States Patent [19]

Suszynski

[11] Patent Number: 4,863,281

[45] Date of Patent: Sep. 5, 1989

[54] PROBE COVER EJECTION APPARATUS FOR MEDICAL THERMOMETER

[75] Inventor: Edward D. Suszynski, Vista, Calif.

[73] Assignee: Diatak, Inc., San Diego, Calif.

[21] Appl. No.: 266,110

[22] Filed: Nov. 1, 1988

[51] Int. Cl.[4] ............................................. G01K 1/08
[52] U.S. Cl. .................................. 374/158; 374/209; 374/208; 206/306
[58] Field of Search ....................... 374/158, 209, 208; 206/306

[56] References Cited

U.S. PATENT DOCUMENTS

| | | | |
|---|---|---|---|
| 738,960 | 9/1903 | Vaughan et al. | 206/306 |
| 3,301,394 | 1/1967 | Baermann et al. | 206/306 |
| 3,673,868 | 7/1972 | Beury, III et al. | 206/306 |
| 3,703,892 | 11/1972 | Meyers | 374/158 |
| 3,832,669 | 8/1974 | Mueller et al. | 374/164 |
| 3,833,115 | 9/1974 | Schapker | 374/209 |
| 3,929,018 | 12/1975 | Turner | 374/158 |
| 4,588,306 | 5/1986 | Burger et al. | 374/158 |

*Primary Examiner*—William A. Cuchlinski, Jr.
*Assistant Examiner*—Diego F. F. Gutierrez
*Attorney, Agent, or Firm*—Pretty, Schroeder, Brueggemann & Clark

[57] ABSTRACT

Apparatus for effectively ejecting a protective cover from the elongated probe of a medical thermometer, even in cases where the cover can stick to the probe surface. The probe cover, which includes a generally cup-shaped body and a resilient ring at the body's open end, is secured in place on the probe by an outwardly-projecting flange at the probe's base end, which retains the probe cover's circular ring. An ejector sleeve reciprocates between a retracted position, in which it is retracted from the elongated probe, and an extended position, in which it fully encircles the probe. A coil spring continuously biases the ejector sleeve to its extended position, but with a force nominally insufficient to free the probe cover's resilient ring from the probe's retaining flange. A manually-actuatable button urges the ejector sleeve into engagement with the probe cover, to free the probe cover's resilient ring from the probe's flange, whereupon the spring thereafter urges the ejector sleeve to its fully extended position, thereby peeling the probe cover from the probe.

15 Claims, 1 Drawing Sheet

PROBE COVER EJECTION APPARATUS FOR MEDICAL THERMOMETER

BACKGROUND OF THE INVENTION

This invention relates generally to medical thermometers of the kind having an elongated probe, and, more particularly, to medical thermometers adapted to receive disposable protective covers for such probes.

Medical or clinical thermometers commonly include an elongated probe adapted for insertion into a patient's body cavity, such as the mouth, rectum or ear. Because such thermometers are commonly used with numerous different patients, it is usually desirable to place a disposable protective cover over the probe prior to each use. This prevents contamination from being passed from one patient to another. Thermometers of this kind, therefore, are usually adapted for the convenient placement of a protective cover over the probe, and after its use with a patient, for the convenient ejection and disposal of the cover.

The apparatus for ejecting the probe cover after use of the thermometer in measuring a patient's temperature preferably is easy to use, requiring no more than the manual pressing of an ejection button or the like. The apparatus also preferably is adapted to fully eject the probe cover even in cases where the cover includes a resilient plastic film that can stick to the probe. It is also preferred that the ejection apparatus not inhibit the initial placement of the disposable cover on the probe.

SUMMARY OF THE INVENTION

The present invention is embodied in an apparatus for selectively ejecting a protective cover from the elongated probe of a medical thermometer, which is effective even if the cover might tend to stick to the probe. The ejection apparatus is used to eject protective covers of the kind that include (1) a generally cup-shaped body having a shape that conforms generally with the shape of the elongated probe, and (2) a resilient ring at the cup-shaped body's open end, the resilient ring being sized to slide over the probe and be retained by an enlargement at the probe's base end. The ejection apparatus includes a sleeve that is movable along an axis aligned with that of the probe, from a retracted position, where the sleeve is located rearwardly of the probe's base end, to an extended position, where the sleeve fully encircles the probe. Spring means continuously biases the sleeve to its extended position with a biasing force insufficient by itself to free the resilient ring from the enlargement at the probe's base end. In accordance with the invention, release means are further included for selectively advancing the sleeve incrementally forwardly from its retracted position, to free the resilient ring from the enlargement at the probe's base end. Thereafter, the spring means automatically advances the sleeve fully to its extended position, to eject the protective cover from the probe. The apparatus is simple in construction and convenient to use, yet completely effective in ejecting the probe cover, even in cases where the probe cover might tend to stick to the probe.

The apparatus of the invention is particularly adapted for use with a probe that is substantially cylindrical and that has an outwardly-projecting, substantially circular flange at its base end. The resilient ring of the protective cover has a circular opening with an unstressed radius less than the radius of the probe's flange; however, the ring is stretchable to slide over and grip the flange, thereby securing the cover in place. The sleeve is likewise substantially cylindrical, with an inner radius sized to slide over the probe's flange and thereby eject the probe cover from the probe. The resilient ring is defined by a thin, flat substrate having a circular aperture, and the sleeve includes a ring-shaped forward surface that is engageable over its entire surface with the probe cover substrate.

In another, more detailed feature of the invention, the spring means includes a compressed coil spring having a longitudinal axis aligned with that of the probe. The release means includes a manually-actuatable button that is movable a limited distance along a axis aligned with the probe's longitudinal axis, to disengage the probe cover's ring from the probe's flange, whereupon the coil spring can advance the sleeve to its fully extended position.

In some situations, the probe cover's cup-shaped body is defined by a resilient plastic film that can stick to the thermometer's elongated probe. The sleeve's extended position is located sufficiently forward of the probe tip to ensure that the probe cover's body is fully disengaged from the elongated probe.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
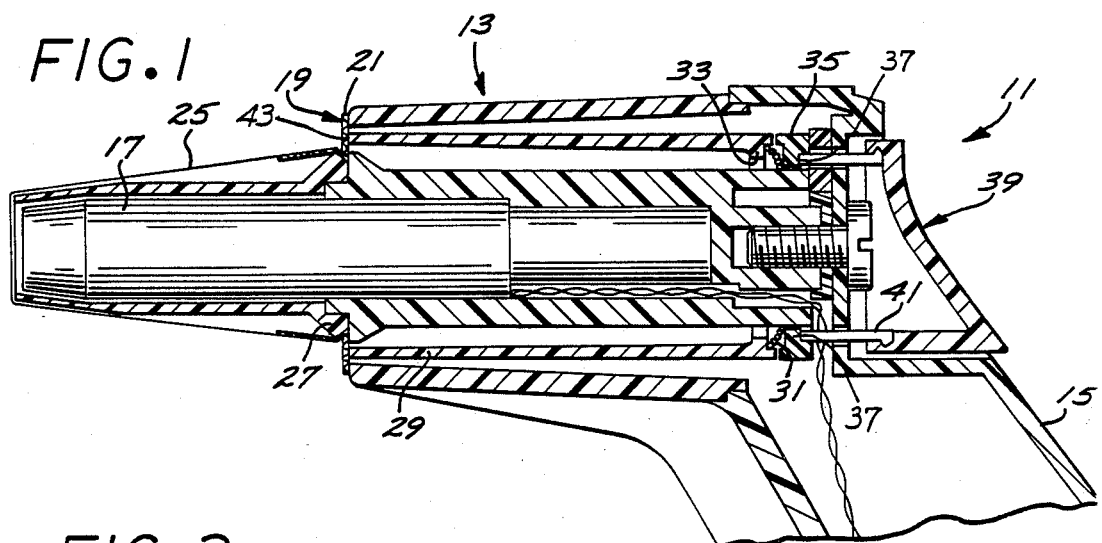
FIG. 1 is a side sectional view of a medical thermometer, with a protective cover located in its desired, functioning position on the thermometer's elongated probe. Ejection apparatus embodying the present invention includes an ejection sleeve depicted in its retracted position.

With reference now to the drawings, and particularly to FIG. 1, there is shown a hand-held medical thermometer 11 that includes a housing 13 having a handle grip 15 and an elongated, generally cylindrical probe 17 adapted for insertion into the outer portion of a patient's ear canal. An infrared radiation sensor (not shown) is located within or adjacent to the probe, for measuring infrared radiation received along the patient's ear canal. The sensor provides, after appropriate electronic processing, an accurate measurement of the patient's body temperature. The thermometer is intended for use with multiple successive patients, so a disposable protective cover 19 is preferably placed over the elongated probe prior to each use.

The protective probe cover 19 includes a substrate or carrier 21 with a generally circular aperture. 23 across which extends a stretchable plastic film 25. In use, the substrate is slid over the elongated probe 17 such that the film stretches over and completely covers the probe. The probe cover is secured in place on the probe by a snap-fit of its resilient substrate over an outwardly-projecting circular flange 27 at the probe's base end. Forming the probe cover substrate of a thin, flexible plastic material facilitates this snap-fit The film, which can be formed of a linear, low-density polyethylene material, is substantially transparent to infrared radiation yet it is sufficiently resilient and tough that it will not puncture or tear during normal usage. A example of one suitable probe cover is described in detail in a copending and commonly-assigned U.S. patent application, Ser. No. 265,525 filed Nov. 1, 1988, and entitled "Disposable Probe Cover Assembly for Medical Thermometer."

Figure 3:
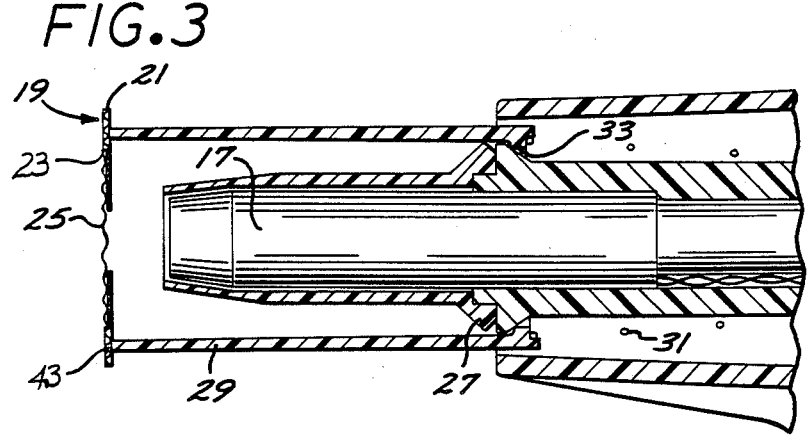
FIG. 3 is a side sectional view similar to FIGS. 1 and 2, but showing the ejection sleeve in its extended position, having fully disengaged the probe cover from the probe.

After each use of the thermometer 11 in measuring a patient's body temperature, it is necessary to eject the protective probe cover 19 from the probe 17. The thermometer therefore includes an ejection apparatus carried within its housing 13. One principal element of the ejection apparatus is a cylindrical ejector sleeve 29 having an inner diameter slightly greater than the diameter of the flange 27 at the probe's base end and having a length that is slightly longer than the length of the probe. The ejector sleeve is coaxial with the probe and reciprocates between a retracted position (FIG. 1), in which it is withdrawn axially from the probe and located fully within the housing, and an extended position (FIG. 3), in which it fully encircles the probe and projects a short distance beyond the probe's remote tip.

The ejector sleeve 29 is continuously biased toward its extended position by a compressed coil spring 31 located within the housing 13. The spring is coaxial with the sleeve and the probe 17 and it is interposed between an inwardly-projecting flange 33 located at the sleeve's rearward end and a circular push ring 35. The pushing, in turn, is restrained from rearward movement by an annular flange 37 integral with said circular push ring 35. The spring has a generally conical shape, with a uniformly decreasing diameter, such that its successive turns nest tightly together when the spring is fully compressed, thereby providing a reduced thickness. Although the spring continuously biases the ejector sleeve toward its extended position, the biasing force is nominally insufficient to dislodge the substrate 21 of the probe cover 19 from its position being retained by the flange 27 at the base end of the probe.

A manually-actuatable ejector button 39 is located at the rear of the housing 13 in general alignment with the common longitudinal axis of the probe 17, ejector sleeve 29, and coil spring 31. The button is snap-fit to a plurality of resilient fingers 41 projecting rearwardly from the push ring 35. Manually pushing on the button, for example using a thumb, moves the button in a forward direction, to correspondingly move the push ring, spring and sleeve. The sleeve's circular forward surface 43 thereby engages the substrate 21 of the probe cover 19, urging it to flex over the probe's flange 27.

With the probe flange 27 no longer retaining the probe cover substrate 21, the biasing force provided by the spring 31 is sufficient to continue urging the sleeve 29 and probe cover 19 in a forward direction. It should be noted that, except for the ejector button 39, the remaining elements of the ejection apparatus, thermometer probe 17, and probe cover 19 are all substantially circumferentially symmetrical.

Figure 2:
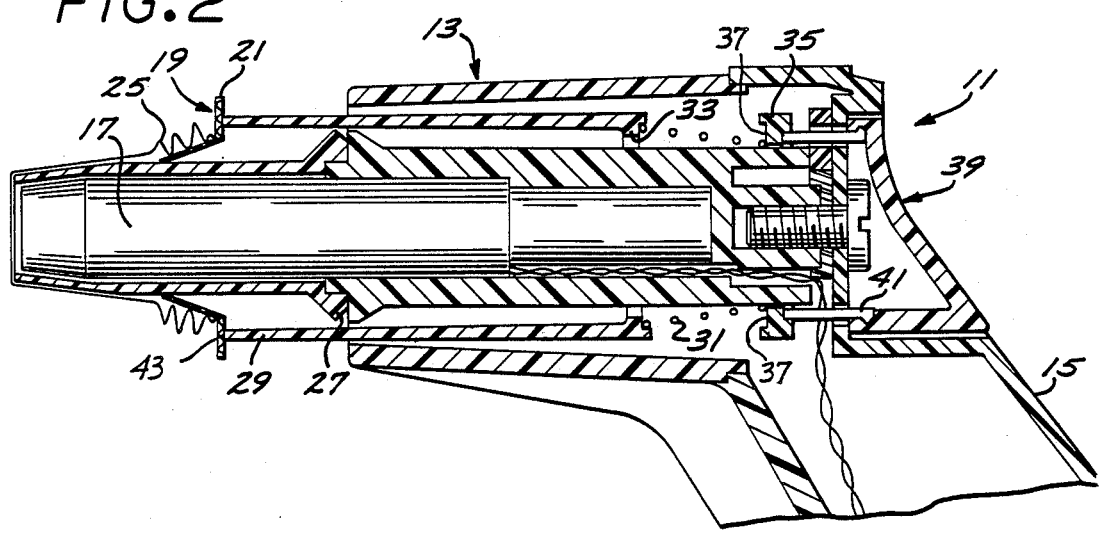
FIG. 2 is a side sectional view similar to FIG. 1, but showing the position of the ejection sleeve after an ejection button has been manually pressed, to disengage the probe cover from an enlargement at the base end of the probe.

FIG. 2 depicts the condition of the ejection apparatus midway through the ejection process, with the ejector sleeve 29 encircling about one-half of the elongated probe 17. It will be observed that the ejector button 39 has been moved only incrementally and that the spring 31 is decompressing, to urge the sleeve away from the button and push ring 35.

The film 25 of the protective probe cover 19, because of its intimate contact with the outer surface of the probe 17, can sometimes tend to stick to the probe. It is therefore important that, when the ejector sleeve 29 is in its extended position (FIG. 3), it extend beyond the probe tip. In this way, the advancing sleeve effectively peels the film from the probe surface. After the ejector sleeve has advanced fully to its extended position, the probe cover will have been fully peeled from the probe surface and the probe cover will be free to drop by gravity into a suitable receptacle for disposal.

When a new probe cover 19 is thereafter to be placed on the probe 17, the probe is simply pushed through the aperture 23 of the probe cover substrate 21 until the substrate is engaged by the flange 27 at the base of the probe. As this is done, the plastic film 25 stretches over the probe and the substrate engages the forward surface 43 of the ejector sleeve 29, to move the sleeve to its retracted position, against the yielding bias of the coil spring 31.

It should be appreciated from the foregoing description that the present invention provides an apparatus for effectively ejecting a protective cover from the elongated probe of a medical thermometer, even in cases where the cover can stick to the probe surface. The probe cover, which includes a generally cup-shaped body and a resilient ring at the body's open end, is secured in place on the probe by an outwardly-projecting flange at the probe's base end, which retains the probe cover's circular ring. An ejector sleeve reciprocates between a retracted position, in which it is retracted from the elongated probe, and an extended position, in which it fully encircles the probe. A coil spring continuously biases the ejector sleeve to its extended position, but with a force nominally insufficient to free the probe cover's resilient ring from the probe's retaining flange. A manually-actuatable button urges the ejector sleeve into engagement with the probe cover, to free the probe cover's resilient ring from the probe's flange, whereupon the spring thereafter urges the ejector sleeve to its fully extended position, thereby peeling the probe cover from the probe.

Although the invention has been described in detail with reference to the presently preferred embodiment, those of ordinary skill in the art will appreciate that various modifications can be made without departing from the invention. Accordingly, the invention is defined only by the following claims.

I claim:

1. Apparatus for ejecting a protective cover from an elongated probe of a hand-held thermometer, wherein the elongated probe has a base end, a remote end, and a longitudinal axis, and wherein the protective cover includes a generally cup-shaped body with a shape that conforms generally with the shape of the elongated probe and further includes a resilient ring at the body's open end, the resilient ring being sized to slide over the probe and be retained by an enlargement at the probe's base end, the apparatus comprising:

a sleeve that is movable along an axis aligned with the longitudinal axis of the probe, from a retracted position, where the sleeve is located rearwardly of the probe's base end, and an extended position, where the sleeve fully encircles the probe;

spring means for continuously biasing the sleeve to its extended position with a biasing force insufficient by itself to free the resilient ring from the enlargement at the probe's base end; and release means for selectively advancing the sleeve forwardly from its retracted position, to free the resilient ring from the enlargement at the probe's base end, whereupon the spring means thereafter advances the sleeve fully to its extended position, to eject the protective cover from the probe.

2. Apparatus as defined in claim 1, wherein:

the probe is substantially cylindrical and the enlargement at the probe's base end is an outwardly-projecting, substantially circular flange;

the resilient ring of the protective cover has an opening that is substantially circular, with an unstressed radius that is less than the radius of the flange at the probe's base end, but that is stretchable to permit the ring to slide over and grip the flange, thereby securing the protective cover in place; and the sleeve is substantially cylindrical, with an inner radius sized to slide over the flange at the probe's base end.

3. Apparatus as defined in claim 2, wherein:

the resilient ring of the protective cover is defined by a thin, flat substrate having a generally circular aperture; and the sleeve includes a ring-shaped forward surface that is engageable over substantially its entire surface with the substrate of the protective cover.

4. Apparatus as defined in claim 1, wherein the spring means includes a compressed coil spring having a longitudinal axis aligned with the longitudinal axis of the elongated probe.

5. Apparatus as defined in claim 1, wherein the release means includes a manually-actuatable button that is movable a limited distance along an axis aligned with the longitudinal axis of the elongated probe.

6. Apparatus as defined in claim 1, wherein:

prior to placement of the protective cover on the probe, the sleeve is located, under the biasing force of the spring means, in its extended position; and the protective cover is placed on the probe by sliding the cover's resilient ring over the probe and into engagement with the enlargement at the probe's base end, against the yielding bias of the spring means.

7. Apparatus as defined in claim 6, wherein:

the probe cover's cup-shaped body is defined by a resilient plastic film that can stick to the thermometer's elongated probe; and the sleeve's extended position is located sufficiently forward of the probe's remote end to fully disengage the probe cover's body from the elongated 8. A hand-held thermometer apparatus comprising:

an elongated probe having a base end with an enlargement, a remote end, and a longitudinal axis, the a protective cover that includes a generally cup-shaped body with a shape that conforms generally with the shape of the elongated probe and a resilient ring at the body's open end, the resilient ring being sized to slide over the probe and be retained by the enlargement at the probe's base end;

a sleeve that is movable along an axis aligned with the longitudinal axis of the probe, from a retracted position, where the sleeve is located rearwardly of the probe's base end, and an extended position, where the sleeve fully encircles the probe;

spring means for continuously biasing the sleeve to its extended position with a biasing force insufficient by itself to free the resilient ring from the enlargement at the probe's base end; and release means for selectively advancing the sleeve forwardly from its retracted position, to free the resilient ring from the enlargement at the probe's base end, whereupon the spring means thereafter advances the sleeve fully to its extended position, to eject the protective cover from the probe.

9. A hand-held thermometer apparatus as defined in claim 8, wherein:

the probe is substantially cylindrical and the enlargement at the probe's base end is an outwardly-projecting, substantially circular flange;

the resilient ring of the protective cover has an opening that is substantially circular, with an unstressed radius that is less than the radius of the flange at the probe's base end, but that is stretchable to permit the ring to slide over and grip the flange, thereby securing the protective cover in place; and the sleeve is substantially cylindrical, with an inner radius sized to slide over the flange at the probe's base end.

10. A hand-held thermometer apparatus as defined in claim 9, wherein:

the resilient ring of the protective cover is defined by a thin, flat substrate having a generally circular aperture; and the sleeve includes a ring-shaped forward surface that is engageable over substantially its entire surface with the substrate of the protective cover.

11. A hand-held thermometer apparatus as defined in claim 8, wherein the spring means includes a compressed coil spring having a longitudinal axis aligned with the longitudinal axis of the elongated probe.

12. A hand-held thermometer apparatus as defined in claim 8, wherein the release means includes a manually-actuatable button that is movable a limited distance along an axis aligned with the longitudinal axis of the elongated probe.

13. A hand-held thermometer apparatus as defined in claim 8, wherein:

prior to placement of the protective cover on the probe, the sleeve is located, under the biasing force of the spring means, in its extended position; and the protective cover is placed on the probe by sliding the cover's resilient ring over the probe and into engagement with the enlargement at the probe's base end, against the yielding bias of the spring means.

14. A hand-held thermometer apparatus as defined in claim 13, wherein:

the probe cover's cup-shaped body is defined by a resilient plastic film that can stick to the thermometer's elongated probe; and the sleeve's extended position is located sufficiently forward of the probe's remote end to fully disengage the probe cover's body from the elongated probe.

15. Apparatus for ejecting a protective cover from an elongated, cylindrical probe of a hand-held thermometer, wherein the elongated probe has a base end with an outwardly-projecting, substantially circular flange, a remote end, and a longitudinal axis, and wherein the protective cover includes a thin, flat substrate having a circular aperture sized to slide over the probe and be retained by the flange at the probe's base end and further includes a plastic film extending across the aperture and stretchable over the probe to assume the general shape of the probe, the apparatus comprising:

a cylindrical sleeve that is movable along an axis aligned with the longitudinal axis of the probe, from a retracted position, where the sleeve is located rearwardly of the probe's base end, and an extended position, where the sleeve fully encircles the probe, the sleeve including a ring-shaped forward surface that is engageable over substantially its entire surface with the substrate of the protective cover;

a compressed coil spring having a longitudinal axis aligned with that of the probe, for continuously biasing the sleeve to its extended position with a biasing force insufficient by itself to free the substrate of the protective cover from the flange at the probe's base end; and a manually-actuatable button that is movable a limited distance along an axis aligned with the longitudinal axis of the elongated probe, to selectively advance the sleeve forwardly from its retracted position and thereby free the substrate of the protective cover from the flange at the probe's base end, whereupon the coil spring thereafter advances the sleeve fully to its extended position, to eject the protective cover from the probe.

* * * * *

UNITED STATES PATENT AND TRADEMARK OFFICE
CERTIFICATE OF CORRECTION

PATENT NO. : 4,863,281

DATED : September 5, 1989

INVENTOR(S) : Edward D. Suszynski

It is certified that error appears in the above-identified patent and that said Letters Patent is hereby corrected as shown below:

On the title page:

Under Assignee, change "Diatak" to --Diatek--.

In column 2, line 67, after "aperture" delete --.--.

In column 3, line 7, after "snap-fit" insert --.--.

In column 5, line 58, after "elongated" insert --probe.--.

Signed and Sealed this

Fourth Day of December, 1990

*Attest:*

HARRY F. MANBECK, JR.

*Attesting Officer*     *Commissioner of Patents and Trademarks*